B. C. Pole
Treadle.
No. 4,184. Reissued Nov. 22. 1870.
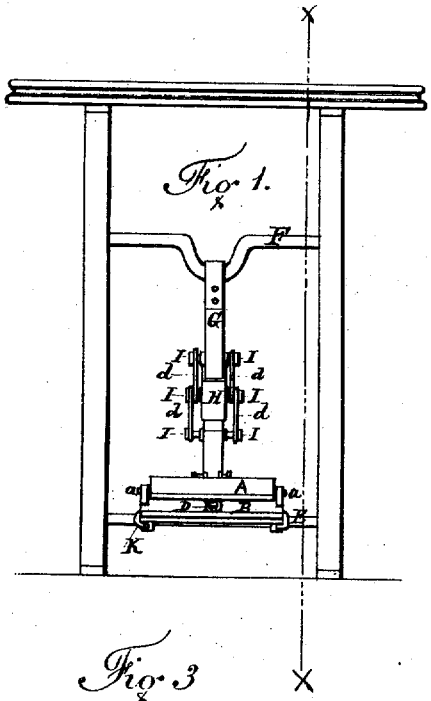
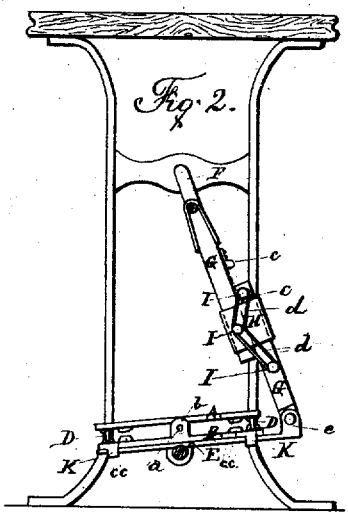
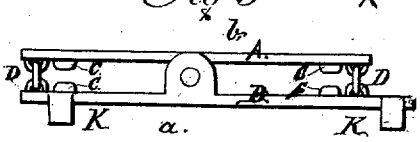
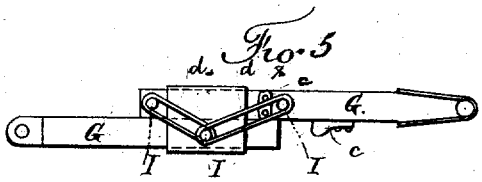
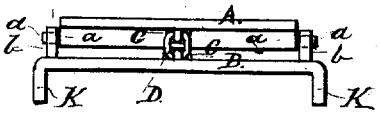
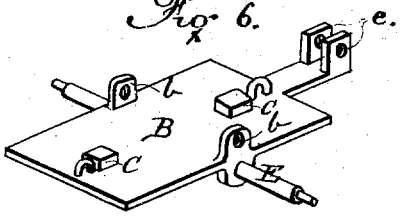
Witnesses.
Thomas Chase
J. F. Beale.
Inventor.
Benjamin Charles Pole
Engineer
N. PETERS, PHOTO-LITHOGRAPHER, WASHINGTON, D. C.

UNITED STATES PATENT OFFICE.

BENJAMIN CHARLES POLE, OF WASHINGTON, DISTRICT OF COLUMBIA.

IMPROVEMENT IN TREADLES FOR SEWING AND OTHER MACHINES.

Specification forming part of Letters Patent No. 107,717, dated September 27, 1870; Reissue No. 4,184, dated November 22, 1870.

*To all whom it may concern:*

Be it known that I, BENJAMIN CHARLES POLE, of the city of Washington, in the District of Columbia, have invented a new and useful Improvement in Treadles and Treadle-Connections for Sewing and other Machines; and I do hereby declare the following to be a clear, full, and exact description thereof, reference being had to the accompanying drawings, and to the letters of reference marked thereon.

The main object of my invention is to do away with those shocks, concussions, and vibrations which are incident to the movements of treadles as heretofore constructed, and by so doing to relieve the operators (usually females) from all injurious effects resulting therefrom; and to this end my improvements consist primarily in a treadle composed of a rigid rocking plate, and another plate rocking therewith and having also a yielding rocking motion of its own; also, in an extensible connecting-rod composed of two rigid parts arranged to move lengthwise relatively to each other against the force of a spring or springs.

They further consist in the combination of such a yielding or elastic treadle with a yielding connecting-rod, and in certain specific details of construction hereinafter described.

Figure 1 is a front view of a table having my improvements applied thereto. Fig. 2 is a side view on the line *x x* of Fig. 1. Fig. 3 is a side view of my improved elastic treadle adapted by its construction to be placed upon and operated in conjunction with an ordinary foot piece or treadle, as shown in Figs. 1 and 2. Fig. 4 is an edge view of the same. Fig. 5 represents a mode of construction of my elastic connecting-rod. Fig. 6 is an isometrical view of the under plate of my improved treadle when constructed for a table or machine not already provided with a treadle or foot-piece.

Referring first to Figs. 1, 2, 3, and 4, A represents my upper rocking or vibrating plate, made of any suitable material and intended for the action of the foot of the operator. It is provided with small projecting pivots *a a* for insertion in the ears *b b* of the bed-plate B, which thus sustains and carries it, but allows it to be rocked thereon. Either or both of the plates A and B, I provide, if desired, with elastic stops C C, and they are also both provided with suitable springs or elastics, D D, whose tension should be about equal and such as to hold the plate A parallel with B when the parts are at rest. The upper and lower elastic stops C, when employed, should be far enough apart to permit the plate A, when rocked upon its two pivotal centers, to be pressed down at its front or back, as the case may be, and thus bring into use, by stretching or distending it, one or the other of the elastic springs or links D D. The stop or stops C which are nearest the link that now becomes relaxed as its opposite one is distended by this action receive the whole strain or pressure imparted by the foot of the operator.

The bed-plate B of my compound treadle I provide with small ears K, turning downward, the object of which is that they shall reach over the edges of the ordinary treadle, F, (see Fig. 1,) of the machine, and thereby hold to position for its proper action my improved apparatus when applied thereto.

As an equivalent for the elastic springs D D, any ordinary spiral or other spring may be used. When these springs are made powerful enough it is evident that the auxiliary stops C C will not be needed and may be omitted.

When I desire to apply my above-described improvement to a machine not already supplied with a treadle I construct its upper plate as already set forth; but I provide the lower plate, B, with a shaft or axis, E, as shown in Fig. 6, journaled at its ends to serve in the place of the axis of the ordinary treadle; and I also project the rear part of such lower plate, as shown and furnish it with any well-known means whereby it may be connected to the connecting-rod or pitman. In other respects this lower plate is substantially the same as in the other figures or as above described.

I will now proceed to describe the yielding or elastic connecting-rod which I have invented, and which I use to connect a treadle with the crank or driving shaft. This rod I make in two sections or pieces, G G, of suitable size and material, and provide one of the pieces with a fixed head or strap, H, through which, under certain conditions, the other piece may work or slide. Attached to the upper piece or section and to each side of the head or strap H is a pin, I, and on each side of the lower section are two other pins, I I, from which rubber or other elastic bands or loops *d d* are carried, so that both shall be fastened to the fixed central pin, I. This construction allows the lower or sliding section to move and ride upon the upper and non-sliding one, but always, however, in either direction of its sliding to be under the stress and resistance of one pair of the spring-loops *d d*. Stops *c c*, of an elastic material, are provided on the pitman or connecting-rod to act as yielding bumpers during the sliding action in either direction, and thereby to prevent too great a thrust. I do not claim any particular material or spring.

By my construction, although the range of motion of the foot of the operator may be slightly greater than with an ordinary non-elastic treadle, yet the power expended or required is not increased, inasmuch as the springs or the springs and stops C C and *c c*, as the case may be, by their resiliency, react so as to assist the foot in its movements.

The maximum increase of the motion of the foot in using my improved treadle is perhaps about one-fourth more than with an ordinary non-yielding treadle.

The whole apparatus may be suitably ornamented, and my improved treadle may be used with an ordinary rigid connecting-rod; or my improved connecting-rod may be used with an ordinary treadle; or both of my said improvements can be used in conjunction, as shown. I prefer thus to use them together.

A most important result attained by my invention occurs when stopping a machine driven by it. The sudden checking of the momentum of the driving or fly wheel is relieved by the yielding resistance of the springs, and there is no abrupt shock or jar imparted to the foot, and thence through the limbs to the hip of the operator, as is unavoidably the case when the connecting-rod and the treadle are rigid. Such shocks frequently recurring in time prove in some cases very injurious to the person. By my improvement the force of the stopping is divided and spent before it reaches the foot, and the effect upon the person is light, gentle, and harmless.

I claim—

1. A treadle composed of a rigid rocking plate, and also of another plate carried by and rocking with it, and having also a yielding or elastic movement of its own.

2. An extensible connecting-rod for a treadle, changeable as to its operative length when in action, and composed of two rigid parts arranged to move lengthwise relatively to each other against the force of a spring or springs.

3. The combination, with an extensible elastic connecting-rod, of a treadle in which one rocking plate works with another rocking plate under elastic tension.

4. The rocking or vibrating plate A, with its springs D D, combined with a vibrating bed-plate, B, and elastic stops C, the whole operating substantially as and for the purposes described.

5. The connecting-rod composed of the pieces G G, the pins I, elastic springs *d d*, the fixed head or strap H, and the elastic stops *c c*, the parts being combined and operating substantially as and for the purpose described.

6. A bed-plate adapted for connection to a connecting-rod, and provided with a shaft and journals, and with ears *b b*, substantially as and for the purpose described.

7. The combination of the elastic treadle, constructed as shown, with the elastic connecting-rod, also constructed as shown in the drawings, the whole operating substantially as and for the purposes set forth.

BENJAMIN CHARLES POLE.

Witnesses:
J. F. BEALE,
JOHN J. HALSTED.